United States Patent [19]

You

[11] Patent Number: 4,583,690

[45] Date of Patent: Apr. 22, 1986

[54] ANTI-WETTING IN FLUID NOZZLES

[75] Inventor: Young S. You, Fremont, Calif.

[73] Assignee: Hewlett-Packard Company, Palo Alto, Calif.

[21] Appl. No.: 759,393

[22] Filed: Jul. 26, 1985

Related U.S. Application Data

[62] Division of Ser. No. 482,123, Apr. 5, 1983, Pat. No. 4,555,062.

[51] Int. Cl.[4] .............................................. G01D 15/18

[52] U.S. Cl. ........................... 239/690; 239/DIG. 19; 239/602; 346/140 R

[58] Field of Search ............... 239/DIG. 19, 602, 690; 346/140 PD, 140 R, 75

[56] References Cited

U.S. PATENT DOCUMENTS 3,921,916 11/1975 Bassous ....................... 239/DIG. 19

*Primary Examiner*—Andres Kashnikow
*Assistant Examiner*—Scott Malpede
*Attorney, Agent, or Firm*—Jeffery B. Fromm

[57] ABSTRACT

A novel ionic surface preparation for nozzles used in spraying fluid droplets such as used in ink jet printers is disclosed. In conjunction with an oppositely charged ionic anti-wetting agent dissolved in the sprayed fluid, the new surface preparation reliably reduces the wetting of the nozzle surfaces, thereby facilitating the production of more uniform and predictable droplets.

5 Claims, 2 Drawing Figures

ANTI-WETTING IN FLUID NOZZLES

CROSS REFERENCE TO RELATED APPLICATION

This is a division of application Ser. No. 06/482,123, filed 4/5/83, now U.S. Pat. No. 4,555,062.

BACKGROUND

Nozzles are frequently used for spraying fluids in the form of individual liquid droplets such as in jet printing with liquid ink. In such systems it is usually undesirable for the fluid that is being sprayed to wet the nozzle surfaces. Such nozzle wetting in ink jet printers, for example, reduces print quality by permitting the generation of spurious droplet called satellites, in addition to the main droplet of interest. In addition, if the wetting is serious enough it is even possible that the liquid will no longer exit the nozzle as drops at all.

A conventional solution to the nozzle wetting is to treat the outer surface of the nozzle with an anti-wetting compound such as a long chain fluorosilane compound. Such coatings are usually applied as thin coats or even monolayers so as not to greatly alter the nozzle characteristics. Unfortunately, such a coating even though on the outer surface of the nozzle is only a temporary solution to nozzle wetting, since the integrity of the anti-wetting compound bond to the nozzle is often sensitive to the constituents of the fluid being sprayed, such as the dyes or the solvents used in many conventional inks, and hence the anti-wetting compound is soon washed away.

SUMMARY OF THE INVENTION

Rather than attempt to permanently bond the anti-wetting compound directly to the outer surface of the nozzle in the present invention, the outer surfaces as well as the inside surface of the nozzle is ionically activated so that the surface is able to selectively adsorb at least some of the anti-wetting compound from the surrounding fluid. A small amount of the anti-wetting compound is then added directly to the fluid being sprayed such as ink so that the anti-wetting agent can be adsorbed from the surrounding fluid and at the same time is constantly replenished on both the inner and outer nozzle surfaces.

If the desired anti-wetting compound is anionic, the nozzle surfaces are pretreated with a cation. In the case of a cationic anti-wetting compound, the surfaces are pretreated with anions. The pretreatment method is primarily dependent on the nature of the material used to produce the nozzle. For example, in the case of a nozzle etched or drilled in a substrate with a surface composed of oxide material such as glass or silicon dioxide or with a metallic surface such as nickel, the surface ion pretreatment can be done by diffusion, implantation, wet-chemistry chemistry techniques or other similar techniques well-known in the processing of integrated circuits.

DETAILED DESCRIPTION OF THE INVENTION

Figure 1:
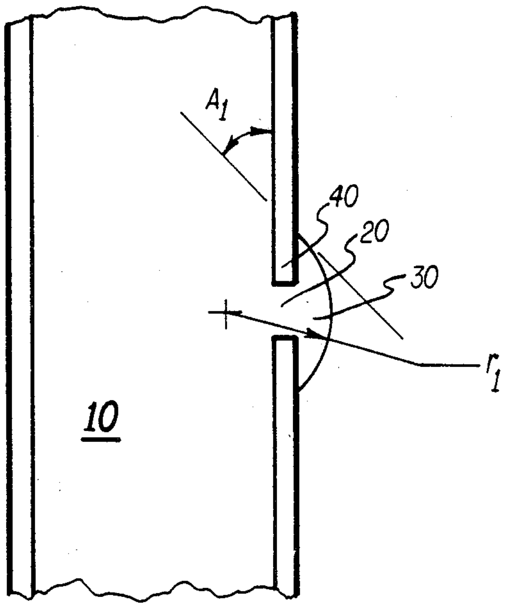
FIG. 1 shows a nozzle without benefit of an anti-wetting compound.

FIG. 1 shows a fluid 10 in a nozzle 20 where no anti-wetting compound is employed. The fluid 10 forms a droplet 30 around the nozzle 20 with a relatively large radius r1 and a shallow contact angle A1 with the surface 40 due to the low surface tension of the fluid 10 with the surface 40. For example, if the fluid 10 is primarily water, the contact angle A1 will be about 30 degrees if the surface 40 is silicon dioxide, or the contact angle A1 will be about 60 degrees if the surface 40 is nickel.

Figure 2:
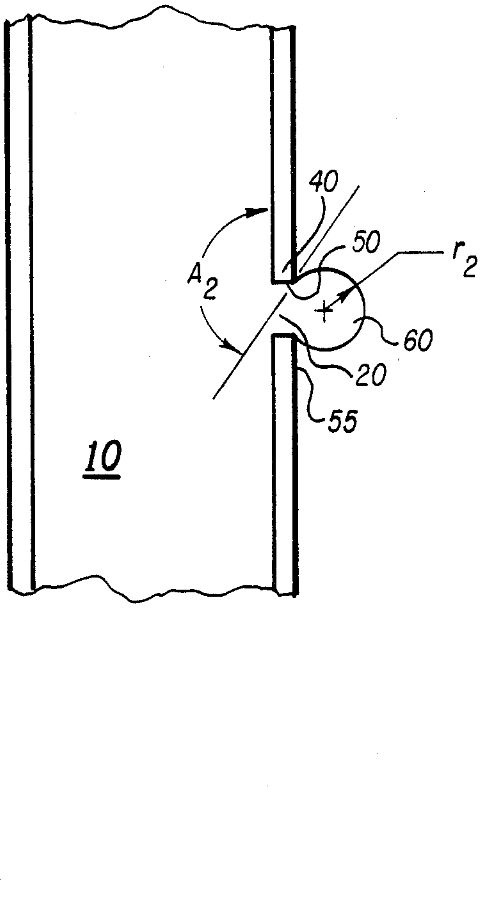
FIG. 2 shows a nozzle using an anti-wetting compound according to the present invention.

FIG. 2 shows the same nozzle 20 making use of the present invention. The surface 40 is treated in region 50 on the inside of the nozzle 20 and region 55 outside the nozzle 20 with appropriate ions. In the case where cations are desired in the regions 50 and 55, P-type ions such as boron can be implanted with a charge density of $1\times10^{14}$ coulombs/square cm if the surface 40 is silicon dioxide; or if the surface 40 is a metal such as nickel, ions such as chromium ($Cr^{+3}$) can be applied by wet-chemistry. A typical long chain anionic non-wetting agent such as FC-143 available from the 3M Company of Minneapolis, Minn. is then dissolved in the fluid 10. Because of the ionic treatment of the nozzle surfaces 50 and 55 it is then possible to reliably maintain the surface tension of the fluid above approximately 45 dynes/cm. The result is a droplet 60 with a radius r2 which is smaller than the radius r1 of droplet 30 and a contact angle A2 which is greater than the contact A1 of droplet 30. In the case of anionically treated water employed with a boron treated silicon surface 40, the contact angle A2 will increase to about 35 degrees; and in the case of anionically treated water employed with a chromate treated nickel surface 40, the contact angle A2 will increase to about 130 degrees.

Ionic treatment of the regions 50 and 55 can also be effected by alternate materials, such as aluminum, barium, iron, tin, chromium, gallium, or indium P-type ions or N-type ions such as phosphorus, arsenic, sulfur, antimony, or bismuth if for example, the surface 40 is silicon dioxide. On the other hand, if the surface 40 is a metal such as nickel, alternate cation materials such as ferric ($Fe^{+3}$), chromium ($Cr^{+3}$), lead ($Pb^{+2}$, or tin ($Sn^{+4}$) ions may be used, and if the surface treatment is with anionic materials phosphate ($PO_4^{-3}$), borate ($BO_3^{-3}$), chromate ($CrO_4^{-2}$), sulfate ($SO_4^{-2}$), or fluoride ($F-$) ions may be employed. It is only necessary that the nozzle surface treatment be ionically opposite to the ionic nature of the non-wetting agent so that the nozzle surface will selectively adsorb the anti-wetting agent. Thus, if the anti-wetting agent is anionic, the surface treatment should be with a cation, and if the anti-wetting agent is cationic, the surface treatment should be with an anion. Therefore, any wetting agent which shows chemically specific adsorbtion onto the pretreated regions 50 and 55 is acceptable. Hence, the surface treatment can be chosen to match the processing characteristics of the surface 40, and the anti-wetting agent can be chosen to be compatible with the fluid 10. In addition, it is now possible for the anti-wetting agent to reliably prevent wetting on both the inner and outer regions 50 and 55 of the nozzle 30.

It should also be noted that in the previous embodiment the ionic pretreatment was applied to both the inner and outer regions 50 and 55 of nozzle 20 so that the anti-wetting agent would effect essentially the entire nozzle 20. Under certain situations such as if the nozzle 20 is constructed of a relatively long tube (e.g., 10 mm long or longer), it may be advantageous to prevent wetting only on a restricted portion of the nozzle surface 40 (e.g., the outer region 55). In such a case, it is only necessary to restrict the region or regions of ionic pretreatment as desired by an appropriate masking step (e.g., with photoresist) prior to the application of the ionic surface treatment. Thus, the anti-wetting compound will only be adsorbed from the fluid 10 onto selected portions of the surface 40, and anti-wetting will occur only in those selected portions.

I claim:

1. A system for spraying a fluid from a nozzle having a surface in contact with said fluid, comprising:

ions of a first type imbedded in at least a portion of the surface of said nozzle; and a chemically specific adsorbing anti-wetting compound having ions of a second type dissolved in the fluid, so that the portion of the surface of the nozzle imbedded with ions of the first type will selectively adsorb the anti-wetting compound from the fluid being sprayed.

2. A system as in claim 1 wherein the ions of the first type are substantially cations, and the ions of the second type are substantially anions.

3. A system as in claim 1 wherein the ions of the first type are substantially anions, and the ions of the second type are substantially cations.

4. A system as in claim 1 wherein the ions of the first type are substantially P-type material, and the ions of the second type are substantially anions.

5. A system as in claim 1 wherein the ions of the first type are substantially N-type material, and the ions of the second type are substantially cations.

* * * * *